(12) United States Patent
Calahan

(10) Patent No.: US 8,099,438 B2
(45) Date of Patent: *Jan. 17, 2012

(54) SYSTEMS AND METHODS FOR PROCESSING XML DOCUMENT AS A STREAM OF EVENTS USING A SCHEMA

(75) Inventor: Patrick Calahan, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/986,923

(22) Filed: Jan. 7, 2011

(65) Prior Publication Data

US 2011/0106824 A1    May 5, 2011

Related U.S. Application Data

(63) Continuation of application No. 11/686,257, filed on Mar. 14, 2007, now Pat. No. 7,870,143, which is a continuation of application No. 10/780,299, filed on Feb. 17, 2004, now Pat. No. 7,653,636.

(60) Provisional application No. 60/451,313, filed on Feb. 28, 2003.

(51) Int. Cl.
*G06F 17/30* (2006.01)

(52) U.S. Cl. ......................................... 707/797; 707/809

(58) Field of Classification Search ........................ None
See application file for complete search history.

(56) References Cited

U.S. PATENT DOCUMENTS

| | | | |
|---|---|---|---|
| 6,125,391 | A | 9/2000 | Meltzer et al. |
| 6,226,675 | B1 | 5/2001 | Meltzer |
| 6,286,064 | B1 | 9/2001 | King et al. |
| 6,453,464 | B1 | 9/2002 | Sullivan |
| 6,519,617 | B1 | 2/2003 | Wanderski et al. |
| 6,621,505 | B1 | 9/2003 | Beauchamp et al. |
| 6,662,342 | B1 | 12/2003 | Marcy |
| 6,684,204 | B1 | 1/2004 | Lal |
| 6,901,410 | B2 | 5/2005 | Marron et al. |
| 6,941,557 | B1 | 9/2005 | Jakobson et al. |
| 6,959,416 | B2 | 10/2005 | Manning et al. |
| 7,062,507 | B2 | 6/2006 | Wang et al. |
| 7,072,985 | B1 * | 7/2006 | Lev-Ami et al. .............. 709/246 |
| 7,134,075 | B2 | 11/2006 | Hind et al. |

(Continued)

OTHER PUBLICATIONS

Desai, A "Instruction to Sequential XPath", XML Conference & Exposition 2002, Dec. 9-14, 2001, pp. 1-10.*
Cover Pages, Early Access Release of Java Architecture for XML Binding (JAXB), "Jun. 14, 2001, pp. 1-2, http://xml.coverpages.org/ni2001-06-14-a.html."

(Continued)

*Primary Examiner* — Baoquoc To
(74) *Attorney, Agent, or Firm* — Fliesler Meyer LLP

(57) ABSTRACT

A system can process an XML document associated with a schema. The system includes a matching component that is capable of receive a discrete piece from a stream of discrete pieces of the XML document. The matching component is capable of further analyzing the schema associated with the XML document and grabbing one or more discrete pieces of the XML document that are related to the discrete piece based on the schema and keeping in memory only the discrete piece of the XML document and said one or more related discrete pieces of the XML document. Then, the matching component can perform a match on said discrete piece and the one or more related discrete pieces of the XML document, and pass the discrete piece and the one or more related discrete pieces of the XML document to a user object for handling when a match is reached.

20 Claims, 3 Drawing Sheets

U.S. PATENT DOCUMENTS

| | | | |
|---|---|---|---|
| 7,237,023 | B2 | 6/2007 | Menard et al. |
| 7,313,758 | B2 | 12/2007 | Kozlov |
| 7,366,973 | B2 | 4/2008 | Sather |
| 7,467,399 | B2 | 12/2008 | Nadalin et al. |
| 2003/0018832 | A1 | 1/2003 | Amirisetty et al. |
| 2003/0065874 | A1 | 4/2003 | Marron et al. |
| 2003/0217094 | A1 | 11/2003 | Andrews et al. |
| 2003/0221168 | A1 | 11/2003 | Kozlov |
| 2004/0019589 | A1 | 1/2004 | Basrur |
| 2004/0028212 | A1 | 2/2004 | Lok et al. |
| 2004/0034830 | A1 | 2/2004 | Fuchs et al. |
| 2004/0068487 | A1 | 4/2004 | Barton et al. |
| 2004/0098383 | A1 | 5/2004 | Tabellion et al. |
| 2004/0103373 | A1 | 5/2004 | Wei |
| 2004/0167864 | A1 | 8/2004 | Wang et al. |
| 2004/0168084 | A1 | 8/2004 | Owen et al. |
| 2005/0234844 | A1 | 10/2005 | Ivanov |

OTHER PUBLICATIONS

Jeckle, "XML and JAVA—wohin geht die Reise?," DaimlerChrysler, Jun. 28, 2001, pp. 1-44, www.jeckle.de.

Cerami, "Web Services Essentials, Distributed Applications with XML-RPC, SOAP, UDDI & WSDL," O'Reilly Online Catalog, Feb. 2002, pp. 1-32, http://www.oreilly.com/catalog/webservess/chapter/ch06.html.

Curley, "Converting Java and CORBA Components to a WS Representation," Feb. 6, 2002, pp. 1-12, http://www.idealliance.org/papers/xmle02/dx_xml302/papers/02-02-06/02-02-06.html.

Abraham, S., "Java Architecture for XML Binding," TopXML: XML Code Library, Feb. 11, 2002, pp. 1-4.

Cover Pages, "Sun Microsystems Announces Java Architecture for XML Binding Beta Implementation," Oct. 24, 2002, pp. 1-5.

* cited by examiner

SYSTEMS AND METHODS FOR PROCESSING XML DOCUMENT AS A STREAM OF EVENTS USING A SCHEMA

CLAIM OF PRIORITY

This application is a continuation application of U.S. patent application Ser. No. 11/686,257 entitled SYSTEMS AND METHODS FOR PROCESSING XML DOCUMENT AS A STREAM OF EVENTS USING XPATH CONTEXT, filed on Mar. 14, 2007 which claims priority to U.S. patent application Ser. No. 10/780,299 entitled SYSTEMS AND METHODS FOR STREAMING XPATH QUERY, filed on Feb. 17, 2004, now U.S. Pat. No. 7,653,636 issued Jan. 26, 2010, which claims priority to U.S. Provisional Application No. 60/451,313, entitled SYSTEMS AND METHODS FOR STREAMING XPATH QUERY, by Patrick Calahan, filed on Feb. 28, 2003, all of which are incorporated herein by reference in entirety.

CROSS-REFERENCED CASES

The following application is cross-referenced and incorporated herein by reference in its entirety:

U.S. patent application Ser. No. 10/304,207 entitled "Selective Parsing of an XML Document," by Chris Fry et al., filed Nov. 26, 2002, now U.S. Pat. No. 7,065,561 issued Jun. 20, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to the querying of data, such as from a document or file.

BACKGROUND OF THE INVENTION

XPath is a W3C language standard that can be used to address or query parts of an XML document. It models an XML document as a tree of nodes, which can include element nodes, attribute nodes and/or text nodes. XPath can be used to identify a subset of an XML document by matching, or determining whether a node matches a pattern, similar to how SQL can be used against a database. In the typical case, an expression written in the XPath language is evaluated against an XML document to determine which parts of the document 'match' the XPath. In order to do this, the XML document must be parsed and represented in memory. One of the standard representations of XML is the Document Object Model (DOM). DOM model presents an XML document as a hierarchy of nodes through which one can navigate arbitrarily. This approach provides a lot of flexibility, but comes at a cost in terms of efficiency and memory use, as the entire document must be brought into memory at one time.

SUMMARY OF THE INVENTION

In one embodiment of the present invention, a system can process an XML document associated with a schema. The system includes a matching component that is capable of receive a discrete piece from a stream of discrete pieces of the XML document. The matching component is capable of further analyzing the schema associated with the XML document and grabbing one or more discrete pieces of the XML document that are related to the discrete piece based on the schema and keeping in memory only the discrete piece of the XML document and said one or more related discrete pieces of the XML document. Then, the matching component can perform a match on said discrete piece and the one or more related discrete pieces of the XML document, and pass the discrete piece and the one or more related discrete pieces of the XML document to a user object for handling when a match is reached.

DETAILED DESCRIPTION

Figure 1:
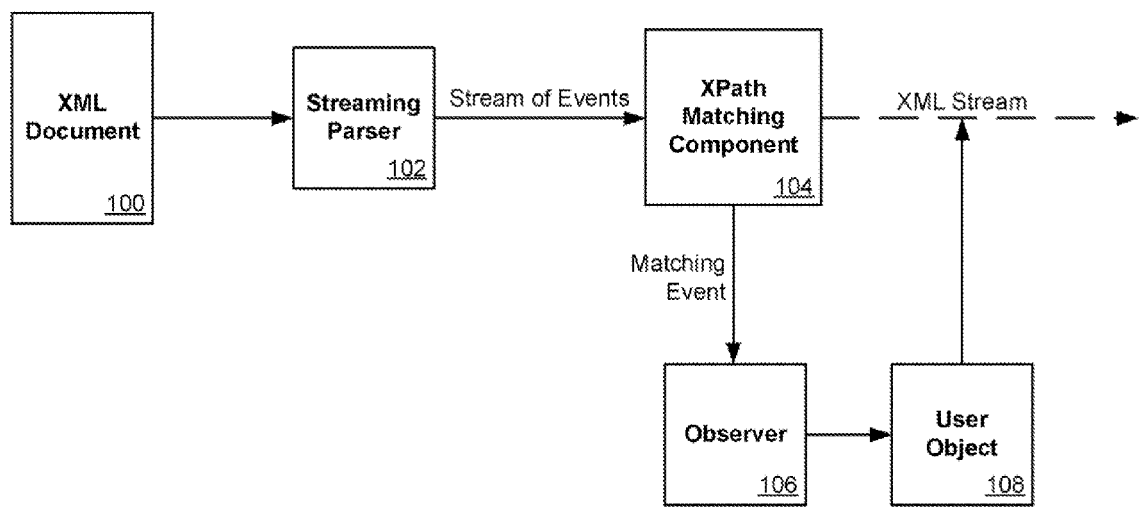
FIG. 1 is a diagram showing an exemplary system that can be used in accordance with one embodiment of the present invention.

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Systems and methods in accordance with one embodiment of the present invention overcome deficiencies in existing XML query systems by representing the XML document as a stream of discrete 'events', with each event representing a portion of the document as the document is being parsed. Event matching can be performed against the event stream. Matching events can then be routed for processing by appropriate objects or components and returned to the event stream if necessary.

XPath can be used to identify a subset of an XML document, similar to how SQL can be used against a database. XPath is a W3C language standard that can be used to address or query parts of an XML document. It can address parts of an XML document by providing basic facilities for manipulating strings, numbers, and Boolean variables. XPath operates on the hierarchical structure, which can be but is not limited to a tree, instead of the syntax of an XML document and can be used for matching, or determining whether a node matches a pattern. It models an XML document as a tree of nodes, which can include element nodes, attribute nodes and/or text nodes and defines a way to compute a string-value for each node type. The primary syntactic construct in XPath is the expression. An expression is evaluated to yield an object of type node-set, Boolean, number, or string. In the typical case, an expression written in the XPath language is evaluated against an XML document to determine which parts of the document 'match' the XPath. In order to do this, the XML document must be parsed and represented in memory.

Systems and methods in accordance with one embodiment of the present invention adopt a true streaming approach, passing bits of an XML document one after another, and it is up to the system to decide what to do with each bit as it passes on the stream. An advantage of a true streaming approach is that such a system is faster and far more memory efficient than a DOM-style approach, since only one portion of the document is in memory at any given time. When using a streaming parser, a system can take a stream on an XML document, generating a stream of events, one event for each node in the XML tree, and perform XPath matching on that stream. A streaming XPath system can also be schema aware, such that the system knows the XML schema for a document, that schema can be used to provide insight on how to most effectively process the document. For instance, the need to go "backwards" in a stream can be avoided if the system knows in advance which events it needs to grab and in what order those events will be received.

A streaming approach can place a greater burden on a system to maintain relevant state than a DOM approach, as a streaming approach may provide no navigation mechanisms. While such an approach provides a very efficient way to process an XML document, the efficiency comes at a cost, as there can be considerably less context available when working with a stream than when working with a DOM tree. Further, XPath has to be able to traverse the hierarchy, in some sense, in order to locate the appropriate portion of the document. In many instances, it is simple to locate an appropriate portion of XML against a DOM tree, since the system is able to walk against the tree. When using a stream, a system has to maintain context in a way that is efficient enough to make using the stream worthwhile. Some tradeoffs can be made, such as not supporting the entire XPath specification. At some point, it may be more efficient to realize an entire DOM tree, if doing a convoluted matching against the entire document.

The XPath specification defines the notion of a context, where a context is the information about an event, consisting of a node it represents, a position of the node relative to a parent node, and a function library, as well as any of several other components such as variable bindings. A location path is a type of expression that can select a set of nodes relative to the context node. The evaluation of a location path expression can result in the node-set containing the nodes being selected by the location path. Location paths can recursively contain expressions used to filter node sets. Expressions can be parsed by first dividing the character string to be parsed into tokens, then parsing the resulting token sequence.

In one embodiment, it is relatively easy to map context to the stream, as the system can maintain a stack of stream events that provide the direct ancestral line back to the root. For instance, matching an XPath that consists solely of child axes can be straightforward. In another embodiment, mapping can become more complicated in the case of descendant axes, similar to matching an entire sub-tree. In those cases, it can be necessary to spawn a tree of contexts and perform matching against each of those contexts. It can become complicated, as the system gets to maintain, and know when you can discard those cloned contexts. It can be even more complicated when matching axes called "following," which match everything below a certain point in the document. In some cases, it is necessary to maintain that context tree and track what to add on to the tree as the system navigates its way back out of the document.

Systems and methods in accordance with one embodiment of the present invention know how to manage the multi-context mode discussed in the proceeding paragraph. They utilize the information of contexts in the stack matching against the expression to recognize when to go into this multi-context mode, when to destroy those contexts, and how to update the context stack appropriately. Certain optimizations can also be used that can know when not to match certain contexts in the context tree. XPath defines different ways to slice up a document, such as parents and children, that each has to be dealt with in a different way.

Figure 2:
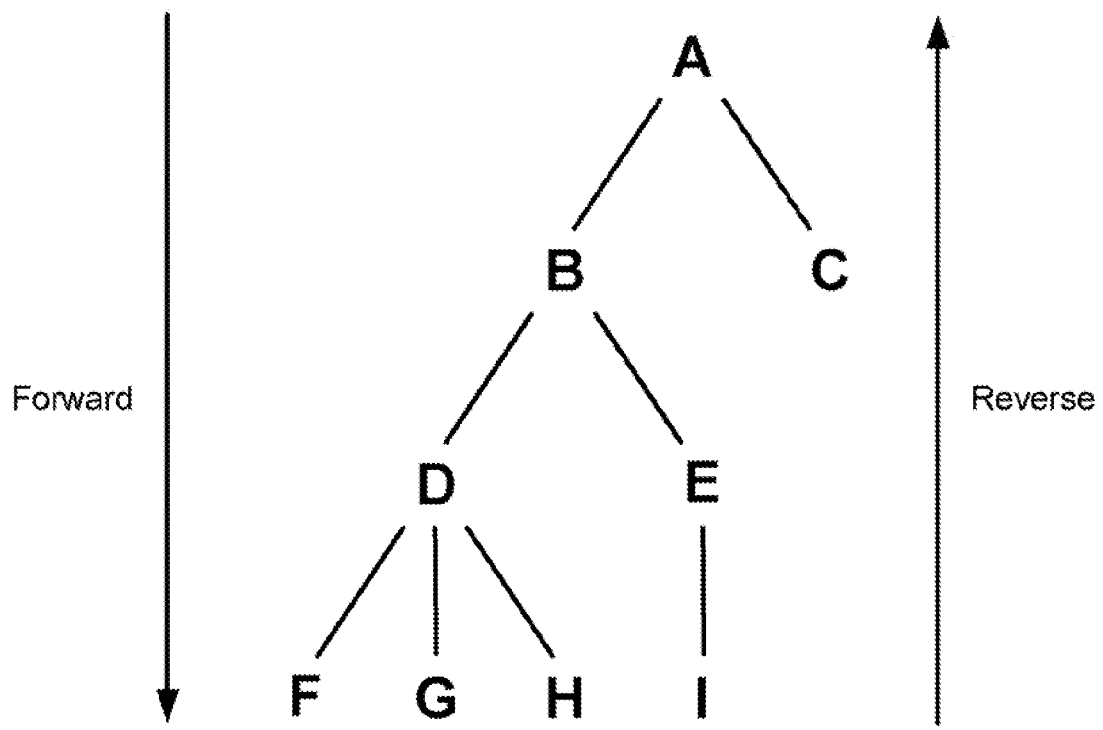
FIG. 2 shows an exemplary data tree that can be used with the system of FIG. 1 in an embodiment.
Figure 3:
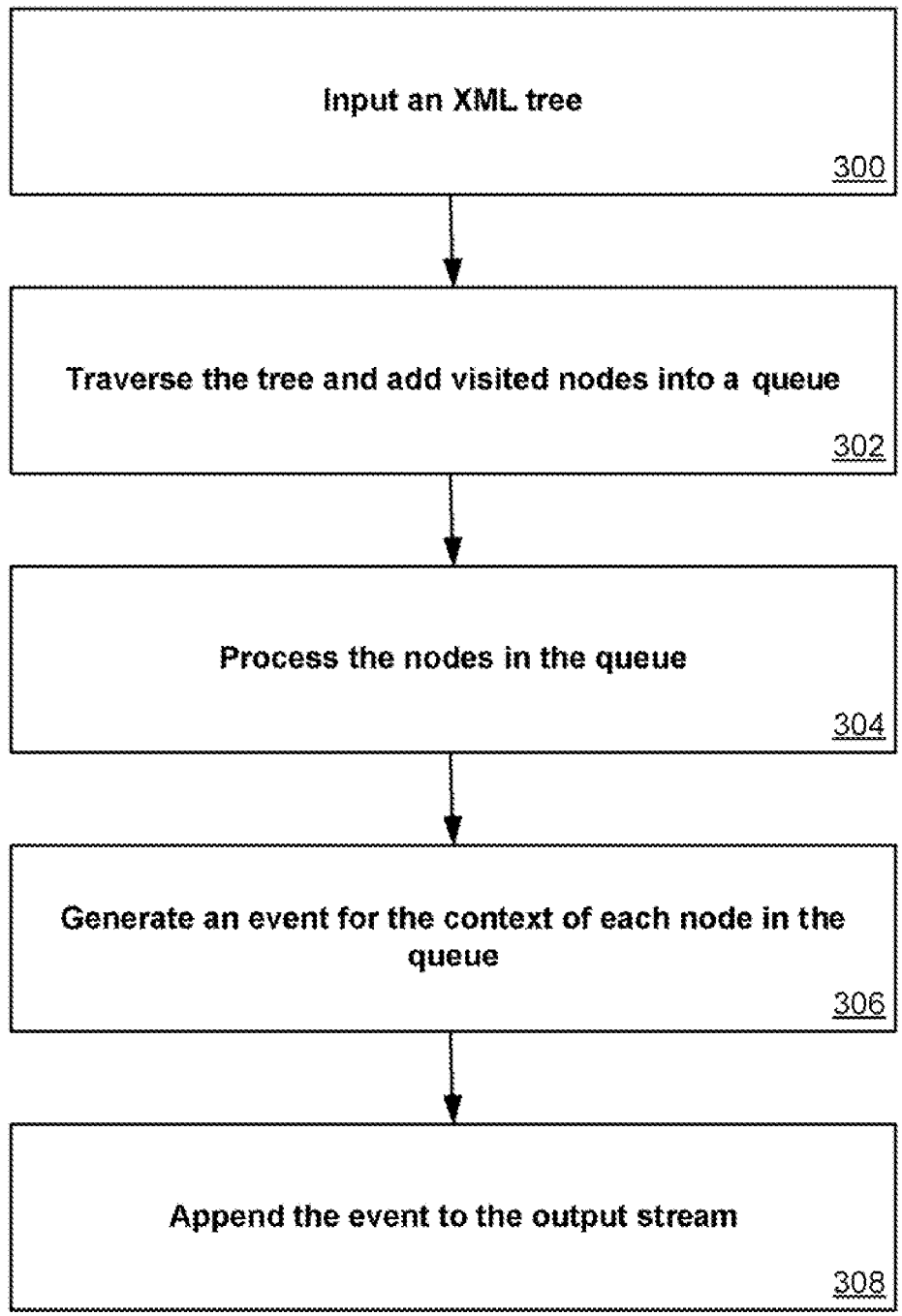
FIG. 3 is a flowchart for an exemplary process that can be used with the system of FIG. 1 in an embodiment.

Systems and methods in accordance with one embodiment do not account for reverse axes. A reverse axis is any axis that would require going "back" through the stream. A diagram showing an exemplary "forward" and "backward" or "reverse" path through a data tree is given by FIG. 2. A diagram of an exemplary system is shown in FIG. 1. A streaming parser 102 generates events by parsing an XML document 100, and then places those events on an XML event stream. Such a streaming process is demonstrated by the diagram of FIG. 3. The streaming parser first takes a tree of an XML document as the input 300, traverses the XML tree either through a broad-first search or a depth-first search and adds each node visited into a data structure, e.g., a queue 302. The streaming parser then processes the queue in the first-in-first-out (FIFO) manner 304 to generate an event for the context of each node in the queue 306 and appends each event to the output stream 308. Using the event stream, the end user of the streaming API pulls events from the stream as they come through it. When a user calls for the next event on the stream, that user has a guarantee that they will get the next event. The user will find out if the next event is going to match, and will find out before the call to next returns.

In one embodiment, an XPath matching component 104 performs matching on each event received on the stream. Matching can be communicated to a caller or end user in a number of ways. These systems are doing event-based processing, as opposed to static tree-based processing. In a tree-based implementation, for example, a user can request all the nodes that match an XPath for a document. The user will receive a collection of nodes that match that XPath. Such an approach is not necessarily effective in the case of streaming, as it is then necessary to read through the document, save all the nodes, and present the collection to the user. This is fundamentally not a stream-centric way of looking at the problem. Instead, using an XPath matching approach, an observer 106 can be registered. The registered observer is an object to be notified whenever an event comes through the stream that matches this XPath. If an event matches an XPath, that event can be temporarily diverted and sent over to a user-defined object 108 that reacts to the match. Then, the event can be returned to the stream if necessary so that any subsequent object pulling events from the stream can process that event.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

The invention claimed is:

1. A system to process an XML document associated with a schema, comprising:
    a streaming parser capable of generating a stream of discrete pieces of the XML document; and
    a matching component, running on one or more processors, capable of
        receiving the stream of discrete pieces of the XML document, wherein the stream of discrete pieces of the XML document contains one or more upstream discrete pieces of the XML document and a downstream discrete piece of the XML document;
        analyzing the schema associated with the XML document and using the schema to determine that the one or more upstream discrete pieces of the XML document are related to the downstream discrete piece of the XML document in the stream of discrete pieces of the XML document;
        keeping in memory said one or more upstream discrete pieces of the XML document before receiving the downstream discrete piece of the XML document from the stream;
        performing a match based on evaluating both the one or more upstream discrete pieces and the downstream discrete piece of the XML document after receiving the downstream discrete piece of the XML document; and
    passing the downstream discrete piece and the one or more upstream discrete pieces of the XML document to a user object for handling when the match is reached in the performing step.

2. The system according to claim 1, wherein:
    the match is an expression-based match, which can be an XPath query.

3. The system according to claim 2, wherein:
    the matching component is further capable of maintaining context associated with the XPath query in a context data structure.

4. The system according to claim 3, wherein:
    said context data structure is a context stack, wherein new context can be added on said context stack and each context in the said context stack can be matched.

5. The system according to claim 3, wherein:
    said context data structure is a context tree, wherein new context can be added on said context tree and each context in the said context tree can be matched.

6. The system according to claim 3, wherein:
    the matching component is further capable of matching only a portion of the context maintained in the context data structure.

7. The system according to claim 1, further comprising:
    the matching component is further capable of representing the XML document in a hierarchical data structure with a plurality of nodes, wherein each node in the hierarchical data structure contains a portion of the XML document.

8. The system according to claim 1, further comprising:
    the matching component is further capable of keeping, cloning and destroying the entirety or a portion of a sub-tree descending from a node in the tree.

9. The system according to claim 1, further comprising:
    the matching component is further capable of using the schema to predict an order in receiving each discrete piece of the XML document from the stream.

10. A method for processing an XML document associated with a schema, comprising:
    receiving a stream of discrete pieces of the XML document, wherein the stream of discrete pieces of the XML document contains one or more upstream discrete pieces of the XML document and a downstream discrete piece of the XML document;
    analyzing the schema associated with the XML document and using the schema to determine that the one or more upstream discrete pieces of the XML document are related to the downstream discrete piece of the XML document in the stream of discrete pieces of the XML document;
    keeping in memory said one or more upstream discrete pieces of the XML document before receiving the downstream discrete piece of the XML document from the stream;
    performing, via a matching component running on one or more processors, a match based on evaluating both the one or more upstream discrete pieces and the downstream discrete piece of the XML document after receiving the downstream discrete piece of the XML document; and
    passing the downstream discrete piece and the one or more upstream discrete pieces of the XML document to a user object for handling when the match is reached in the performing step.

11. The method according to claim 10, further comprising:
    the match is an expression-based match, which can be an XPath query.

12. The method according to claim 11, further comprising:
    maintaining context associated with the XPath query in a context data structure.

13. The method according to claim 11, wherein:
    said context data structure is a context stack, wherein new context can be added on said context stack and each context in the said context stack can be matched.

14. The method according to claim 11, wherein:
    said context data structure is a context tree, wherein new context can be added on said context tree and each context in the said context tree can be matched.

15. The method according to claim 11, wherein:
    matching only a portion of the context maintained in the context data structure.

16. The method according to claim 10, further comprising:
representing the XML document in a hierarchical data structure with a plurality of nodes, wherein each node in the hierarchical data structure contains a portion of the XML document.

17. The method according to claim 10, further comprising:
keeping, cloning and destroying the entirety or a portion of a sub-tree descending from a node in the tree.

18. The method according to claim 10, further comprising:
using the schema to predict an order in receiving each discrete piece of the XML document from the stream.

19. A non-transitory machine readable storage medium having instructions stored thereon that when executed cause a system to:
  receive a stream of discrete pieces of the XML document, wherein the stream of discrete pieces of the XML document contains one or more upstream discrete pieces of the XML document and a downstream discrete piece of the XML document;
  analyze the schema associated with the XML document and use the schema to determine that the one or more upstream discrete pieces of the XML document are related to a downstream discrete piece of the XML document in the stream of discrete pieces of the XML document;
  keep in memory said one or more upstream discrete pieces of the XML document before receiving the downstream discrete piece of the XML document from the stream;
  perform a match based on evaluating both the one or more upstream discrete pieces and the downstream discrete piece of the XML document after receiving the downstream discrete piece of the XML document; and
  pass the downstream discrete piece and the one or more upstream discrete pieces of the XML document to a user object for handling when the match is reached in the performing step.

20. The system according to claim 1, further comprising:
the matching component is further capable of avoiding a need to go backward in the stream to grab the one or more discrete pieces of the XML document.

* * * * *

UNITED STATES PATENT AND TRADEMARK OFFICE
CERTIFICATE OF CORRECTION

PATENT NO. : 8,099,438 B2  Page 1 of 1
APPLICATION NO. : 12/986923
DATED : January 17, 2012
INVENTOR(S) : Calahan It is certified that error appears in the above-identified patent and that said Letters Patent is hereby corrected as shown below:

On Title page, item [56] in column 2, under "Other Publications", line 1, delete ""Instruction" and insert -- "Introduction --, therefor.

Signed and Sealed this
Third Day of April, 2012

David J. Kappos
*Director of the United States Patent and Trademark Office*